UNITED STATES PATENT OFFICE.

FREDERICK LAIST, FREDERICK F. FRICK, AND ROBERT S. OLIVER, OF ANACONDA, MONTANA, ASSIGNORS TO ANACONDA COPPER MINING COMPANY, OF ANACONDA, MONTANA, A CORPORATION OF MONTANA.

PROCESS OF PREPARING IRON-FREE ALUM.

1,300,418. Specification of Letters Patent. Patented Apr. 15, 1919.

No Drawing. Application filed April 24, 1918. Serial No. 230,496.

*To all whom it may concern:*

Be it known that we, (1) FREDERICK LAIST, (2) FREDERICK F. FRICK, and (3) ROBERT S. OLIVER, citizens of the United States, residing at Anaconda, in the county of Deerlodge and State of Montana, have invented certain new and useful Improvements in Processes of Preparing Iron-Free Alum, of which the following is a specification.

This invention is a process applicable to the preparation of commercially pure sulfate compounds of aluminum, especially potassium alum, from clays or equivalent impure aluminous raw materials.

It has been proposed heretofore, especially in the preparation of pure aluminum sulfate or "alum cake" from clays, to reduce any ferric iron contained in the original leach liquor to the ferrous state in order to avoid discoloration of the alum cake or solidified product resulting from the evaporation of the solution. Such methods have not however provided an iron-free product, but merely a relatively colorless product, owing to the relatively low coloring or staining power of ferrous salts.

We have observed that whereas alum recovered by crystallization from solutions containing ferric sulfate is apt to be strongly contaminated by iron, the same does not hold true in case the iron, at the moment of separation of the alum, exists solely in the ferrous state. In other words, we have found that ferrous sulfate is quite free from the tendency which is strongly marked with ferric sulfate, to replace aluminum in its sulfate combinations. By taking advantage of this discovery we are enabled to prepare from ferruginous solutions the desired aluminum salts substantially uncontaminated by either ferrous or ferric iron.

In the application of our invention to the preparation of substantially pure alum from ferruginous clays, we prefer to proceed as follows:—

The clay is first mixed with concentrated sulfuric acid, and the mixture is heated to 300°–400° centigrade in order to decompose the aluminum silicate, as well as potassium silicate, if present. This reaction results in the formation of aluminum and potassium sulfates, more or less sulfate of iron being likewise produced. The soluble sulfates are now extracted by means of hot water, or a solution of potassium sulfate, and any ferric iron in the resulting solution is reduced to the ferrous state by means of metallic aluminum, metallic iron, sulfur dioxid, or other appropriate reducing agent.

The solution which now contains essentially aluminum sulfate, ferrous sulfate, and possibly potassium sulfate, is filtered from the residue which consists chiefly of silica. The clear solution is mixed hot with sufficient potassium sulfate (unless this has been added to the leaching solution) to form potassium alum by reaction with all of the aluminum sulfate contained in the solution. Preferably the solution is then cooled as rapidly as possible, and is stirred while cooling in order that the resulting crystals of potassium alum may be of small size. The precipitate formed under these conditions is similar in appearance to granulated sugar. This is however merely a preferable mode of procedure. For example, the solution may be run into ponds or other crystallizing system where the cooling will take place slowly, in which case the crystals will be large in size. The crystals obtained by the method first described are somewhat purer than those obtained by the latter method.

If the iron in the original solution has been completely reduced to the ferrous state before the addition of potassium sulfate, the resulting alum will be remarkably free from iron. This is highly important, especially in case the alum is to be used for the preparation of pure alumina, available for such special purposes as the manufacture of metallic aluminum. A cyclical process whereby such pure alumina may be prepared is described and claimed in our co-pending application Serial Number 227,722, filed April 10, 1918.

Instead of adding the amount of potassium sulfate requisite for the production of potassium alum to the reduced solution, the potassium sulfate may of course be introduced wholly or in part into the leach liquor.

In so far as sulfates of the other alkali metals may be capable of replacing potassium sulfate in this reaction they are to be regarded as equivalent thereto for the purposes of this invention.

It is obvious that the process above described as applicable to the preparation of alum from clay, is equally applicable to the preparation of alum from impure aluminum sulfate from any source, including alunite or the like.

We claim:—

1. A process of preparing substantially pure aluminum salts from iron-bearing aluminous materials, comprising converting the aluminum component of the raw material into aluminum sulfate contaminated by ferric iron; reducing the ferric iron to the ferrous state; and crystallizing and recovering aluminum from the resulting solution in the form of a sulfate compound containing an alkali metal sulfate but substantially free from ferric or ferrous iron.

2. A process of preparing substantially pure potassium alum from iron-bearing aluminous materials, comprising converting the aluminum component of the raw material into aluminum sulfate contaminated by ferric iron; reducing the ferric iron to the ferrous state; and crystallizing and recovering the aluminum from the resulting solution in the form of potassium alum substantially free from ferric or ferrous iron.

3. A process of preparing substantially pure potassium alum from iron-bearing aluminous materials, comprising converting the aluminum component of the raw material into aluminum sulfate contaminated by the ferric iron; reducing the ferric iron to the ferrous state; treating the resulting aluminum sulfate in aqueous solution with potassium sulfate in proportion to produce potassium alum; and crystallizing and recovering the alum substantially free from ferric or ferrous iron.

In testimony whereof, we affix our signatures.

FREDERICK LAIST.
FREDERICK F. FRICK.
ROBERT S. OLIVER.